(12) United States Patent
Yates

(10) Patent No.: US 6,260,919 B1
(45) Date of Patent: Jul. 17, 2001

(54) BICYCLE SADDLE WITH W-FRAME

(76) Inventor: Paul M. Yates, 5814 Briar Tree Dr., LaCanada, CA (US) 91011

( * ) Notice: Subject to any disclaimer, the term of this patent is extended or adjusted under 35 U.S.C. 154(b) by 0 days.

(21) Appl. No.: 09/495,686

(22) Filed: Feb. 1, 2000

(51) Int. Cl.[7] .......................................................... B62J 1/02
(52) U.S. Cl. ........................ 297/215; 297/198; 297/195.1
(58) Field of Search ................................. 297/195.1, 214, 297/215, 215.16, 198

(56) References Cited

U.S. PATENT DOCUMENTS

| | | | |
|---|---|---|---|
| 3,146,024 | * 8/1964 | Timms | 297/215.16 |
| 5,108,076 | * 4/1992 | Chiarella | 297/214 |
| 6,010,188 | * 1/2000 | Yates | 297/195.1 |

* cited by examiner

Primary Examiner—Anthony D. Barfield
(74) Attorney, Agent, or Firm—Walter A. Hackler

(57) ABSTRACT

The bicycle saddle includes a flexible frame having a W-shaped cross section with fore and aft depending portions between the horn and a tail of the flexible frame for enabling the longitudinal flexing of the frame. A resilient cushion is provided and disposed on the flexible W-frame between the horn and the tail and a rail fixed to the fore and aft depending portions is provided for attaching the flexible W-frame to a bicycle.

20 Claims, 2 Drawing Sheets

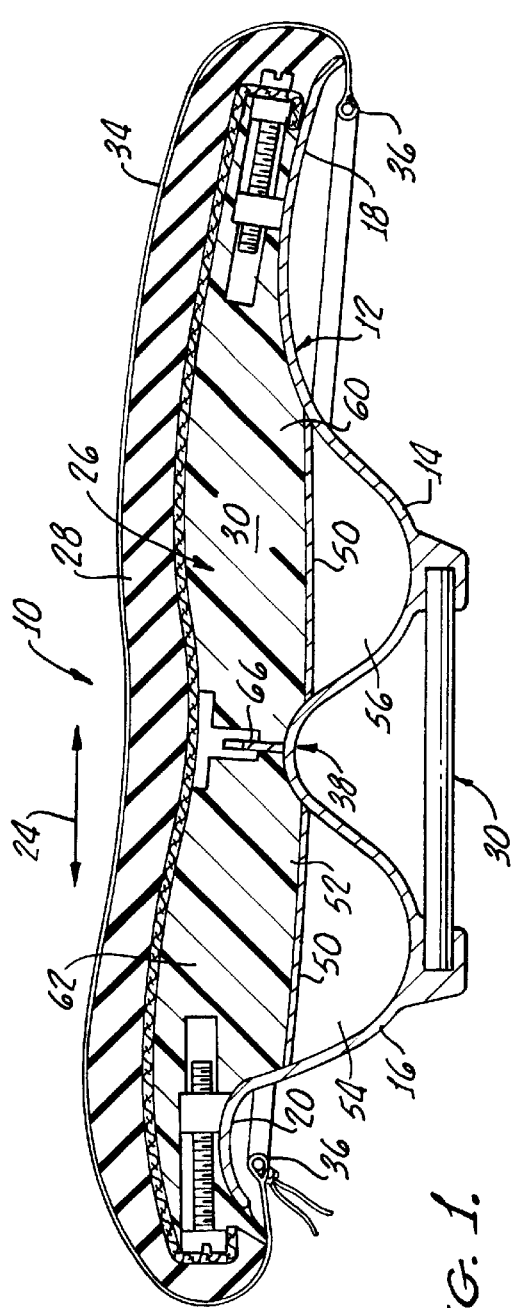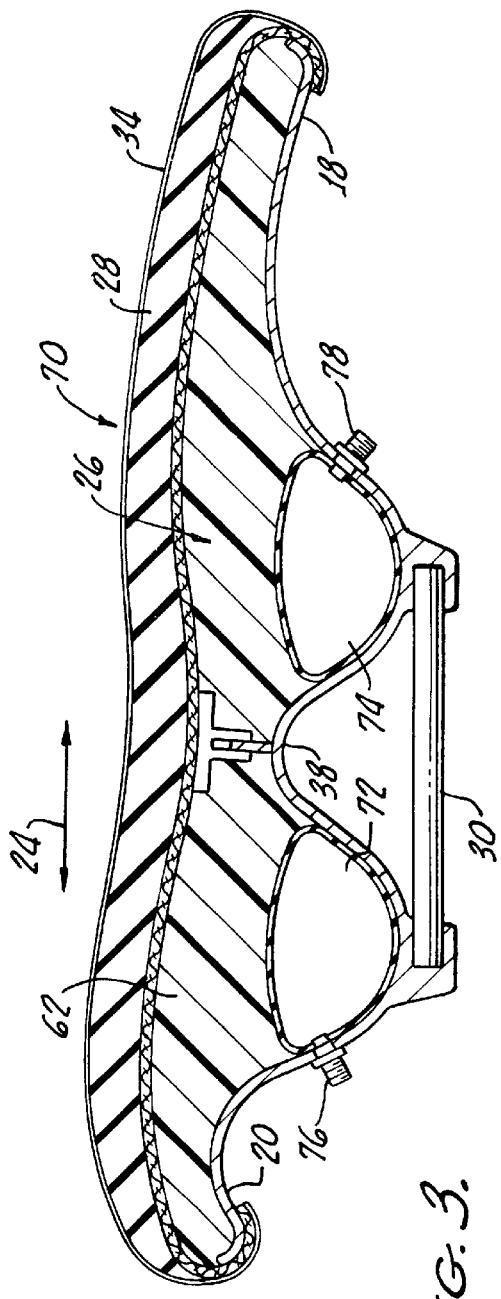

BICYCLE SADDLE WITH W-FRAME

The present invention generally relates to bicycle saddles and is more particularly directed to a bicycle saddle having controllable cushioning.

In bicycle saddles for general use, and for high performance, the stiffness of the saddle can materially affect user comfort and performance. Saddle flexibility or resilience is desirable in order to promote user comfort. However, a saddle that is soft and spongy also permits a substantial degree of vertical movement which, in turn, promotes user abrasion and soreness.

Of fundamental importance in a bicycle saddle with regard to its overall resiliency is the bicycle saddle frame. While many frames have been developed, none have directly enabled longitudinally flexing thereof. This longitudinal flexing, in combination with the proper resilient cushion disposed thereon, can effect a substantially improved and more comfortable ride than bicycle saddles currently available. Thus, it is important that the bicycle frame and the cushion utilized in combination therewith work in a synergistic manner in order to provide a superior ride for the user.

While adjustment mechanisms and systems have been provided for enabling a change in flexibility for the saddle, most of these systems require tedious adjustments which are time consuming, and not amenable to adjustment in the field.

It should be appreciated that under prolonged use a saddle may tend to relax which changes the stiffness or resilient characteristics of the saddle. Thus, field adjustment is important in enabling the cyclist from realizing full enjoyment and comfort of the saddle and bicycle.

The present invention provides a bicycle saddle in which a flexible frame is utilized in combination with a resilient cushion in order to provide a comfortable ride for a user. Importantly, the resilience of the saddle is adjustable in order to enable the saddle to be used by both general purpose and high performance cyclists. Further, the adjustment is easily performed in the field utilizing a screwdriver. Accordingly adjustment for saddle relaxation, hereinabove mentioned, or a change in road conditions is easily accomplished.

SUMMARY OF THE INVENTION

A bicycle saddle in accordance with the present invention generally includes a flexible frame having a W-shaped cross section for enabling longitudinal flexing of the W-frame. The frame includes fore and aft depending portions which define the W-shaped cross section, with the depending portions being disposed between the horn and a tail of the W-frame. Thus, the W-frame in accordance with the present invention, because of its shape, inherently provides for flexing in a longitudinal direction. This direction of freedom, or flexing, has heretofore not been available with prior art frames.

A cover can be attached to the W-frame at horn, tail and center of the W-frame in order to provide a dual hammock saddle. The tension of the cover between the horn and center and the center and the center and tail may be different in order to customize the resiliency of the saddle.

Alternatively, a resilient cushion is disposed under the cover and on the flexible W-frame between the horn and the tail and rail means are provided and fixed to the fore and aft depending portions for attaching the flexible frame to a bicycle.

Means are provided for adjustably compressing the resilient cushion in order to change an effective resiliency of the cushion between a rider and the frame. This adjustable resiliency, when taken in combination with the longitudinal flexing capability of the frame, provides for multiple degrees of cushioned freedom of movement for the rider.

In one embodiment of the present invention, the means for adjustably compressing the resilient cushion, includes a seat material disposed over the resilient cushion between the frame horn and the tail, and at least one fore tension screw attached between the seat material and the frame horn and at least one aft tension screw attached between the seat material and the tail frame. The control over the change of resiliency may be enhanced by utilizing a supporting floor.

Support for the floor may be further enhanced through the use of ribs, disposed in the fore and aft depending portions, which provide a means for supporting the frame floor.

The compressing means may include two horn tension screws attached to the frame horn and a front of the seat material and further, means for angularly positioning the two horn screws with respect to one another may be provided in order to provide both longitudinal and lateral tension to the seat material. This arrangement materially affects the tensioning provided on the seat material which, in turn, provides a greater degree of effecting a change in the resiliency of the cushion by various tension screw settings.

Similarly, the compressing means may include two tail tension screws attached to the W-frame in a rear of the material in which the aft tension screws are angularly positioned in order to provide a means to both longitudinally and laterally tension the seat material. The effect of the two aft tension screws is similar to the two fore tension screws hereinabove described.

In addition, the compressing means may further comprise a third tail tension screw attached to the W-frame and the material rear and means for positioning the third tail tension screw between the two tension screws to enable the third tail tension and screw to provide an additional longitudinal tension to the seat material.

The tensioning may be enhanced by utilizing front rod and rear rod means attached, respectively, to the two horn tension screws and the three tail tension screws and the seat material in order to distribute tension imparted to the seat material by the tension screws.

In another embodiment of the present invention, means for adjustably compressing the resilient cushion may comprise an inflatable bladder disposed between the flexible frame and the resilient cushion. In combination therewith, the tension screws may also be utilized to provide a further degree of resiliency control on the cushion.

BRIEF DESCRIPTION OF THE DRAWINGS

The advantages and features of the present invention would be better understood by the following description when considered in conjunction with the accompanying drawings, in which:

FIG. 1, is a cross sectional view of a bicycle saddle with controllable cushioning in accordance with the present invention, generally showing the flexible frame having a W-shaped cross section with fore and aft portions between a horn and a tail of the flexible W-frame along with a resilient cushion disposed on the flexible W-frame and mounting rails fixed to the fore and aft depending portions for attaching the flexible W-frame to a bicycle (not shown);

FIG. 3 is a cross sectional view of an alternative embodiment of the present invention which utilizes a flatable bladder for compressing the resilient cushion, which may be used in combination with the tension screws shown in FIGS. 1 and 2.

DETAILED DESCRIPTION

Figure 2:
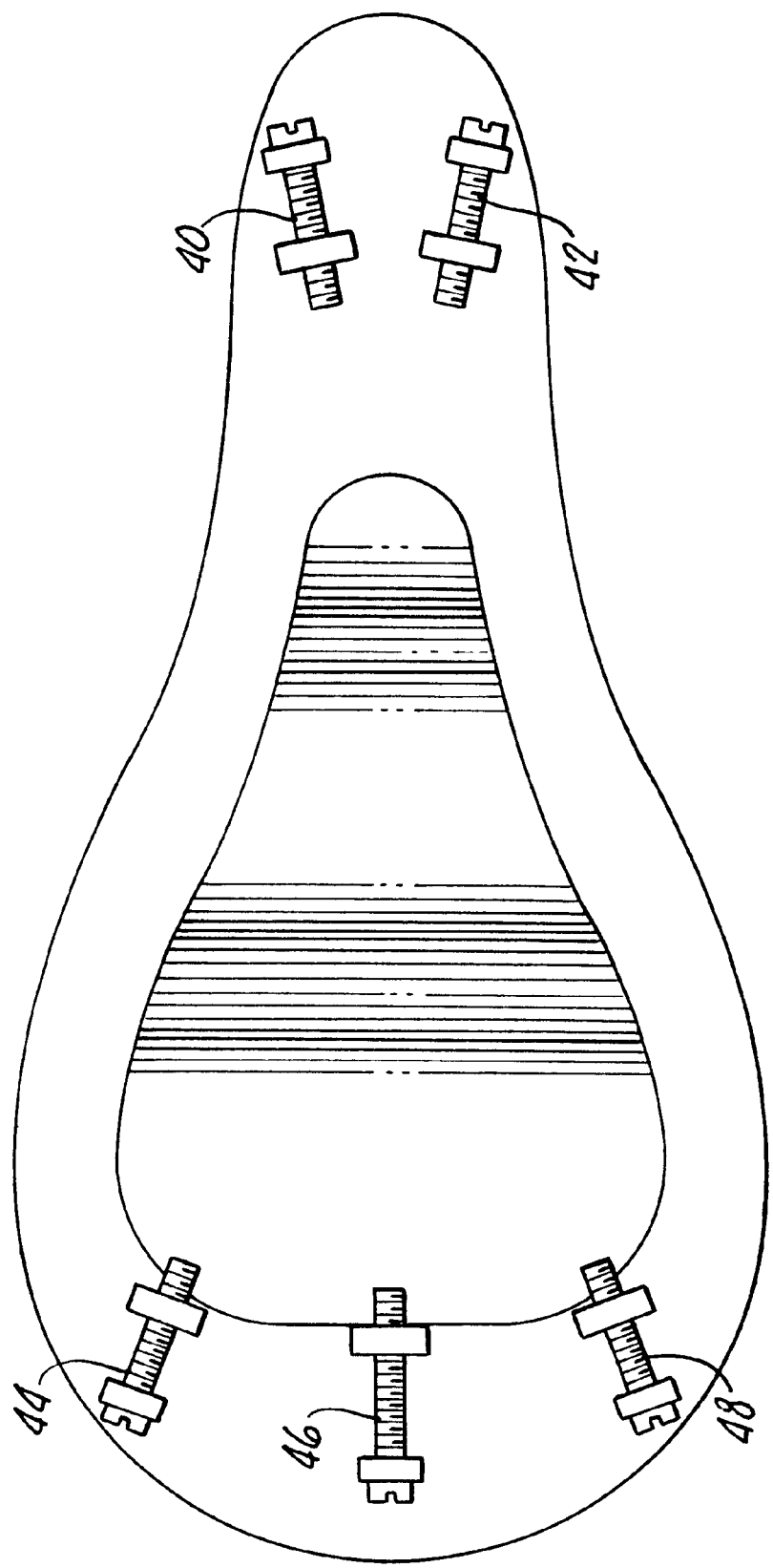
FIG. 2 is a top view of the saddle shown in FIG. 1, more particularly showing fore and aft tensioning screws for adjustably compressing the resilient cushion in order to change an effective resiliency of the cushion between a rider and the W-frame.

With reference to FIG. 1, there is shown a bicycle saddle 10 having a flexible frame 12, which conforms to a generally W-shape, and includes fore and aft depending portions 14, 16 between a tail 18 and a horn 20 of the flexible frame 12. As hereinabove noted, the W-shaped cross section provides for longitudinal flexing of the frame as indicated by the arrow 24. The frame 12 may be made from any suitable metal or plastic material selected in order to provide such flexibility and afford the longitudinal flexure, which is a characteristic of the bicycle saddle 10 in accordance with the present invention.

A resilient cushion 26 is disposed on the flexible W-frame between the horn 18 and the tail. As shown, the resilient cushion 26 may be comprised of various layers 28, 30, and may include combinations of compressible gels and/or foams, which are well known in the art for use as cushioning material. Rails 30 fixed to the fore and aft depending portions 14, 16, are provided for attaching the flexible frame 12 to a bicycle (not shown). A seat material, or cover 34, is disposed over the cushion 26 and may be gathered at the horn 18 and tail 20 by means of a drawstring 36. Alternatively, the cover 34 can be used without the cushion and attached directly to the frame at the horn 18 and tail 20 as well as to a center 38 of the W-frame in any conventional manner. In this instance the cover 34 acts as a hammock between the horn 18 and center 38 and separately as a hammock between the center 38 and the tail 20. The cover can be ??? differently between the horn 18 and center 38 and between the center 38 and the tail 20 in order to provide different resiliencies. For example, the tension of the cover 34 between the center 38 and tail may be less than the tension between the center 38 and horn 18.

Importantly, the cover 34 is attached to fore tension screws 40, 42, and aft tension screws 44, 46, 48. These tension screws provide a means for providing tension in the cover 34 which adjustably compresses the resilient cushion 26 (see FIG. 2).

As shown in FIG. 1, the bicycle saddle 10 may include a frame floor 50 for providing a stable source for an underside of 52 of the cushion 26 in order to enhance the compressibility of the cushion 26 by changing the tension in the cover 34 by way of the tensioning screws 40, 42, 44, 46, 48. To further support the floor 50, ribs 54, 56 may be provided in the fore and aft depending portions 14, 16.

It should be appreciated that the cushion 26 may include a first resilient pad 60 disposed between the seat material 34 and the W-frame 12 in the horn area 18 and a second resilient pad 62 disposed between the seat material 34 and the frame 12 in a tail portion 20 of the saddle 10. These materials may be of different initial resiliency and separated by a partition 66. The first resilient pad 60 may be bonded in any conventional manner to the frame horn 18 and the second resilient pad 62 may be bonded to the frame tail 20 in any conventional manner.

More specifically with reference to FIG. 2, the compression of the cushion is accomplished through the use of two horn tension screws 40, 42 attached to the frame horn as shown in FIG. 1 and a front of the seat material 40.

Further, three tail tension screws 44, 46, 48 are provided and angularly positioned with respect to one another in order to provide longitudinal and lateral tension to the seat material. The angular arrangement of the fore tension screws 40 and 42 also provides longitudinal and lateral tension to the seat material. This longitudinal and lateral tensioning of the seat material against the cushion 26 enables a great number of compressible configurations of the cushion in order to accommodate the needs of a rider. Rods 50, 52 may be provided and attached to the two horn tension screws and the rear tension screws, respectively, in order to distribute tension in part to the seat material by the fore tension screws 40, 42 and the aft tension screws 42, 46, 48.

An alternative embodiment 70 of the present invention is shown in FIG. 3 with like character reference indication identical or substantially the same component as discussed in connection with the saddle 10 shown in FIG. 1.

In this embodiment, a pair of bladders 72, 74 are provided for compressing the cushion 26, either separately or in combination with the tensioning screws (not shown in FIG. 3). Pressure in the bladder 70 to 74 may be controlled by valve 76, 78 which may be fitted for connection to a conventional tire pump, thereby enabling in the field adjustment of the resiliency of the saddle by a user.

Although there has been hereinabove described a specific arrangement of a bicycle saddle in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A bicycle saddle comprising:
   a flexible frame having W-shaped cross section, with fore and aft depending portions between a horn and a tail of said flexible frame, for enabling longitudinal flexing of said flexible frame;
   a hammock cover attached to a center of the W-frame and between said horn and tail; and
   rail means, fixed to the fore and aft depending portions, for attaching said flexible frame to a bicycle.

2. The bicycle saddle according to claim 1 further comprising a resilient cushion disposed between the cover and the W-frame.

3. A bicycle saddle comprising:
   a flexible frame having W-shaped cross section, with fore and aft depending portions between a horn and a tail of the flexible W-frame, for enabling longitudinal flexing of the flexible W-frame;
   a resilient cushion disposed on the flexible W-frame between said horn and tail; and
   rail means, fixed to the fore and aft depending portions, for attaching the flexible W-frame to a bicycle.

4. The bicycle saddle according to claim 3 further comprising means for adjustably compressing said resilient cushion in order to change an effective resiliency of the cushion between a rider and the frame.

5. The bicycle saddle according to claim 4 wherein the means for adjustably compressing said resilient cushion comprises a seat material disposed over said resilient cushion between the frame horn and tail and at least one fore tension screw attached between said seat material and the frame horn and at least one aft tension screw attached between said seat material and the frame tail.

6. The bicycle saddle according to claim 5 wherein the means for adjustably compressing said resilient cushion further comprises a frame floor disposed in the fore and aft depending portions.

7. The bicycle saddle according to claim 6 further comprising rib means, disposed in the fore and aft depending portions, for supporting said frame floor.

8. The bicycle saddle according to claim 5 wherein the compressing means comprises two horn tension screws attached to the frame horn and a front of said seat material and means for angularly positioning the two horn screws with respect to one another in order to provide both longitudinal and lateral tension to said seat material.

9. The bicycle saddle according to claim 8 wherein the compressing means further comprises two tail tension screws attached to the W-frame and a rear of said material and means for angularly positioning the two tail screws with respect to one another in order to provide both longitudinal and lateral tension to said seat material.

10. The bicycle saddle according to claim 9 wherein the compressing means further comprises a third tail tension screw attached to the W-frame and the material rear and means for positioning said third tail tension screw between the two tail tension screws and enabling said third tail tension screw to provide longitudinal tension to said seat material.

11. The bicycle saddle according to claim 10 further comprising front rod means attached to the two horn tension screws and the front of said material for distributing tension imparted to said seat material.

12. The bicycle saddle according to claim 10 further comprising rear rod means attached to the three tail tension screws and the rear of said material for distributing tension imparted to said seat material.

13. The bicycle saddle according to claim 4 wherein the means for adjustably compressing said resilient cushion comprises an inflatable bladder disposed between the flexible W-frame and said resilient cushion.

14. The bicycle saddle according to claim 13 wherein the means for adjustably compressing said resilient cushion further comprises a seat material disposed over said resilient cushion between the frame horn and tail and at least one fore tension screw attached between said seat material and the frame horn and at least one aft tension screw attached between said seat material and the frame tail.

15. The bicycle saddle according to claim 14 wherein the means for adjustably compressing said resilient cushion further comprises a frame floor disposed in the fore and aft depending portions.

16. The bicycle saddle according to claim 15 wherein the compressing means comprises two horn tension screws attached to the frame horn and a front of said seat material and means for angularly positioning the two horn screws with respect to one another in order to provide both longitudinal and lateral tension to said seat material.

17. The bicycle saddle according to claim 16 wherein the compressing means further comprises two tail tension screws attached to the W-frame and a rear of said material and means for angularly positioning the two tail screws with respect to one another in order to provide both longitudinal and lateral tension to said seat material.

18. The bicycle saddle according to claim 17 wherein the compressing means further comprises a third tail tension screw attached to the W-frame and the rear of said material and means for positioning said third tail tension screw between the two tail tension screws and enabling said third tail tension screw to provide longitudinal tension to said seat material.

19. The bicycle saddle according to claim 18 further comprising front rod means attached to the two horn tension screws and the front of said material for distributing tension imparted to said seat material.

20. The bicycle saddle according to claim 19 further comprising rear rod means attached to the three tail tension screws and the rear of said material for distributing tension imparted to said seat material.

* * * * *